United States Patent [19]

De Forges De Parny et al.

[11] Patent Number: 5,474,259
[45] Date of Patent: Dec. 12, 1995

[54] PROCESS FOR INTERVENTION ON OVERHEAD CABLES BY MEANS OF HELICOPTER-CARRIED FORK AND NACELLE

[75] Inventors: Robert De Forges De Parny, Cadolive; Gérard Moudin, Albertville; Philippe Ruaux, Rognac, all of France

[73] Assignee: Electricite de France Service National, Paris, France

[21] Appl. No.: 874,010

[22] Filed: Apr. 27, 1992

[30] Foreign Application Priority Data

Apr. 29, 1991 [FR] France .................. 91 05255

[51] Int. Cl.$^6$ .................. B64D 1/12; B64D 1/22
[52] U.S. Cl. .................. 244/118.1; 244/137.4
[58] Field of Search .................. 244/137.4, 137.1, 244/118.1; 294/67.2, 67.22, 68.3, 82.35; 414/608, 609, 785; 182/142, 150

[56] References Cited

U.S. PATENT DOCUMENTS

| | | | |
|---|---|---|---|
| 2,764,307 | 9/1956 | Kughler | 414/607 |
| 3,248,074 | 4/1966 | Cannon | 244/137.4 |
| 3,863,736 | 2/1975 | McWilliams | 182/150 |
| 4,478,312 | 10/1984 | Kurtgis | 182/142 |
| 4,542,928 | 9/1985 | Fowler, Jr. | 294/67.2 |
| 4,553,719 | 11/1985 | Ott | 244/137.4 |
| 4,722,106 | 2/1988 | Scegiel et al. | 294/67.2 |
| 5,184,929 | 2/1993 | Reynolds | 294/67.22 |
| 5,221,176 | 6/1993 | Allen et al. | 414/785 |

FOREIGN PATENT DOCUMENTS 0511909  11/1992  European Pat. Off. .............. 182/150

Primary Examiner—William Grant
Attorney, Agent, or Firm—Pearne, Gordon, McCoy & Granger

[57] ABSTRACT

The nacelle (2) and the fork (20) permit rapid interventions by helicopter on bundle-type overhead cables (1). The metal nacelle (2) carrying operators and equipment has on its sides (16) fixing hooks (14). The nacelle (2) can be fixed to overhead cables (1) by fixing bars (7) equipped with notches (8). The fork (20) has gripping ends (22) able to grasp the nacelle (2) beneath hooks (14). It is equipped with pyrotechnic bolts allowing jettisoning to take place if it is urgently necessary to lighten the load of the helicopter. Application to the repair and maintenance of overhead cables of the public power distribution network and in particular to the replacement of coupling sleeves.

8 Claims, 4 Drawing Sheets

PROCESS FOR INTERVENTION ON OVERHEAD CABLES BY MEANS OF HELICOPTER-CARRIED FORK AND NACELLE

FIELD OF THE INVENTION

The invention relates to the repair and maintenance of overhead cables, such as the electric cables of the power distribution network. The invention is particularly adapted to the replacement of coupling sleeves between two sections of an overhead cable. The invention can also apply to the cables of transportation means, such as cable railways and the like and able to carry the supplementary weight of a maintenance nacelle. Indirectly, the invention also relates to helicopter transportation.

PRIOR ART

Once installed, most overhead cables require numerous repair and maintenance operations. Thus, within the framework of the maintenance and repair operations to the public power distribution network, Electricité de France has to carry out numerous interventions. For example, the replacement of a coupling sleeve between two sections of an overhead cable makes it necessary to place the cable on the ground, for the purpose of carrying out the repairs, followed by the putting back into place of the cable suspended between two pylons. Such an intervention takes a long time and is costly.

The invention aims at facilitating, improving and accelerating such operations on any random overhead cable.

SUMMARY OF THE INVENTION

To this end, a first object of the invention is a process for intervention on at least one overhead cable by means of a nacelle, which can carry equipment and operators and has means for fixing the nacelle to the cables. According to the invention, the process consists of fixing the nacelle to a carrying element, suspending the carrying element on a helicopter, carrying with the latter the carrying element and the nacelle, positioning the nacelle between the cables, fixing the nacelle to at least one cable and detaching or removing the carrying element from the nacelle.

Therefore a team of operators can work for a certain time on one or more cables, whereas the carrying helicopter has left to carry out other tasks. To complete this process, according to the invention, it is also possible to remove the nacelle placed on the cables by a process comprising suspending a carrying element on a helicopter, positioning by helicopter the carrying element close to the nacelle placed on the cables, fixing the nacelle to the carrying element, detaching the nacelle from the cables, removing the nacelle from the cables and bringing to the ground by helicopter the nacelle and the carrying element.

A second main object of the invention is therefore a helicopter-carried nacelle constituted by a metal structure within which can be carried the operators and equipment, the nacelle comprising means for fixing to a carrying element, which can be suspended on a helicopter and means for fixing to at least one overhead cable to enable the fixing of the nacelle to the said cables.

In the preferred embodiment of the nacelle according to the invention, the latter has two end side walls outside which are placed the means for fixing to the carrying element. In this case, the means for fixing to the carrying element are constituted by a downwardly oriented hook and below which can penetrate a gripping end of the carrying element.

It is preferable to provide locking means for each of the gripping ends in the corresponding hook. In this case, said locking means can be in the form of a pin traversing the gripping end and at least the hook or end side wall.

The preferred construction of the means for fixing the nacelle to the cables involves the use of fixing bars, in which are formed downwardly open notches, when the bars are fixed to the upper parts of the end side walls and whose shape and position correspond to the shape and respective position of the cables. Means for locking the fixing bars to the nacelle are provided in order to ensure the permanent fixing of the nacelle to the cables, the notches being oriented downwards.

A third object of the invention is a helicopter-carrying fork constituting the carrying element of the aforementioned process and comprising securing means to the slings of a rope of a helicopter, at least two gripping ends extending horizontally when the fork is suspended, so as to penetrate the corresponding fixing means of an object to be grasped and carried by helicopter. This fork is particularly applicable in connection with the aforementioned nacelle and incorporating lockable fixing means using the pin. In this case, the fork has holes in the gripping ends in order to allow the said pins to penetrate.

The safety standards make it necessary that in this case the fork is constituted by a metal structure connected to an upper bar by several pyrotechnic bolts connected by pyrotechnic cords to control means to be operated from the helicopter or by operators, for the purpose of jettisoning the metal structure and the equipment carried in the case of force majeure and having means for securing the operators to the upper bar.

LIST OF DRAWINGS

The explanatory, detailed description of the invention is accompanied by the drawings, wherein show:

FIG. 1 A preferred application of the invention to electric cables.

FIG. 2 The nacelle and fork according to the invention.

FIG. 3 The use of pyrotechnic means for jettisoning the metal structure of the fork according to the invention.

FIG. 4 A front view of the fixing means of the fork to the nacelle.

FIGS. 5A and 5B Two embodiments of locking bars used on the nacelle according to the invention to fix it to overhead cables.

DETAILED DESCRIPTION OF AN EMBODIMENT OF THE INVENTION

Figure 1:
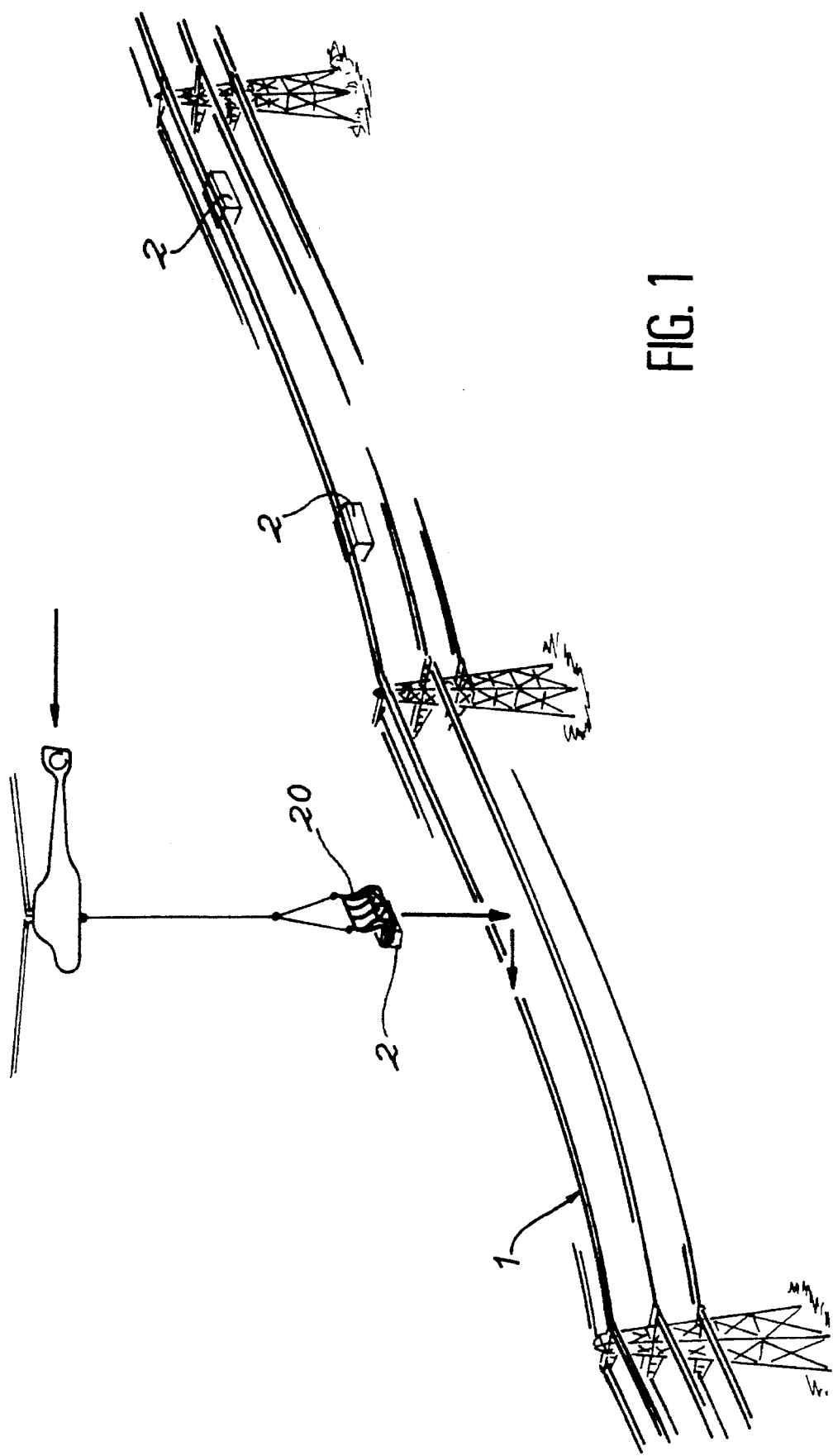

FIG. 1 makes it easy to understand the intervention process according to the invention. Thus, FIG. 1 shows an overhead cable network 1, a nacelle 2 suspended on a helicopter by means of a fork 20, whilst other nacelles 2 are placed on the overhead cables 1. They serve to bring a team of operators alongside one or more overhead cables 1 for carrying out maintenance or repair operations thereon. With the aid of a helicopter, it is easy to place several nacelles 2 enabling operations lasting 10 or 20 minutes to be carried out on the overhead cables and can then collect them once the work is completed.

According to the invention the following intervention process phases are carried out on such overhead cables. A nacelle 2 is fixed to a carrying element 20, which is to be suspended on a helicopter. As shown in the drawings, this carrying element is preferably a fork-shaped metal structure, which grasps the nacelle 2. It is pointed out that the nacelle 2 is intended to carry operators and their equipment, with a view to carrying out repairs or maintenance on one or more overhead cables 1. The present invention is more particularly adapted to the maintenance and repair of one or more cables of a bundle of overhead cables 1, as shown in FIG. 1. This is followed by suspending the carrying element 20 or fork on a carrying helicopter, by means of which the repair mission is to be completed. The assembly constituted by the nacelle 2 and the carrying element 20 is then transported by helicopter to the repair point, namely in this case on one or more cables 1. The nacelle 2 is then positioned on the cables 1 at the location where the operation is to be performed (it is possible to fix the nacelle to a single overhead cable 1, but then the nacelle will suffer from instability risks). The nacelle 2 is reliably and stably fixed to the cables 1, so that the operators can safely carry out the necessary operations. The nacelle 2 is then detached from the carrying element preferably constituted by the fork and the latter is removed from the nacelle. The latter operation enables the helicopter to manipulate one or more other nacelles 2 with the aid of the fork 20, whilst the nacelle 2 which has been positioned on the overhead cables 1 is operational in order to carry out the maintenance operation on one or more cables.

It is therefore possible to rapidly embark a team of operators, e.g. for carrying out an operation consisting of replacing a coupling sleeve between two parts of the same overhead cable 1. Such an operation can be carried out with a force take-up jack carried by the nacelle 2. It serves to maintain the tension between the two parts of the cable 1 to be repaired and on which the nacelle 2 is partly positioned throughout the coupling sleeve replacement operation.

Figure 2:
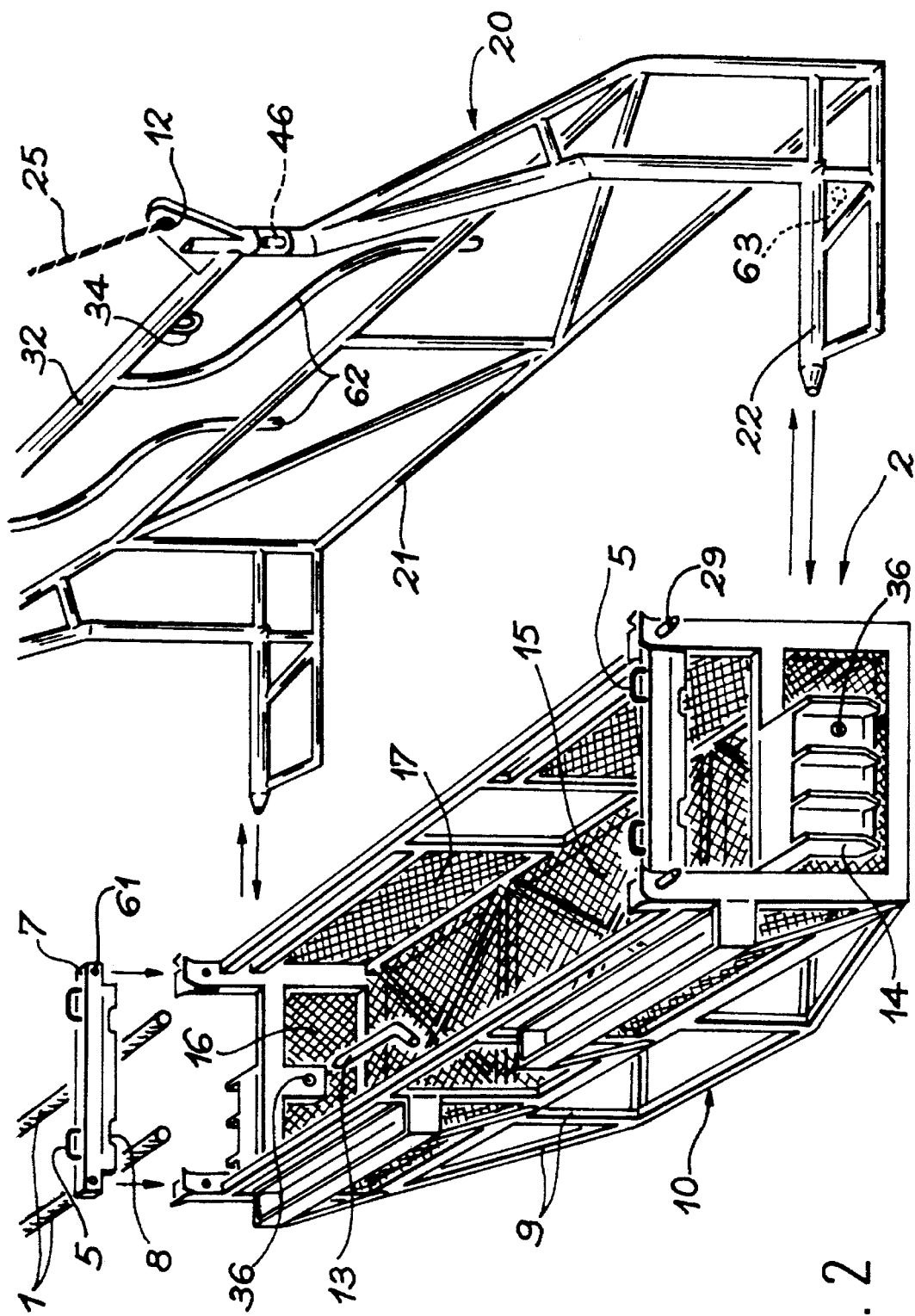

The process according to the invention is obviously completed by the removal of the nacelle 2 from the cables 1. This operation is carried out by helicopter involving the carrying of a carrying element such as the fork 20 and the positioning of the latter with its gripping elements ready to cooperate with the corresponding fixing elements for the nacelle 2. Although no precise positioning details are apparent from FIG. 1, FIG. 2 shows that in the preferred embodiment of the fork, gripping ends 22 are provided for fixing in the fixing means 14 of the nacelle 2. The nacelle 2 is then fixed to the fork 20, preferably by locking the gripping ends 22 in the fixing means 14. The nacelle 2 is then unlocked from the cables 1 on which it is positioned. The nacelle 2 is then removed from the cables 1 by means of the helicopter by a lateral release below the cables 1 in the case of FIG. 2. The nacelle 2 and fork 20 are then placed on the ground.

Details of the process will be given hereinafter during the description of the main elements making it possible to carry out these interventions on the cables 1.

Nacelle

For the description of the latter, reference should be made to the left-hand part of FIG. 2. The latter is constituted by a metal structure 10 using angle members and posts, so as to define a volume constituting a field of operation for a teem of operators. It mainly comprises a floor 15 and side walls 16, 17, which can be made from sheet metal or a metal lattice. The tank formed by the floor 15 and the side walls 16, 17 can be rigidified over its length by lower bars 9 arranged in a triangulated system.

Outside the end side walls 16 are located fixing means 14 on the carrying element, here constituted by the fork 20.

Figure 4:
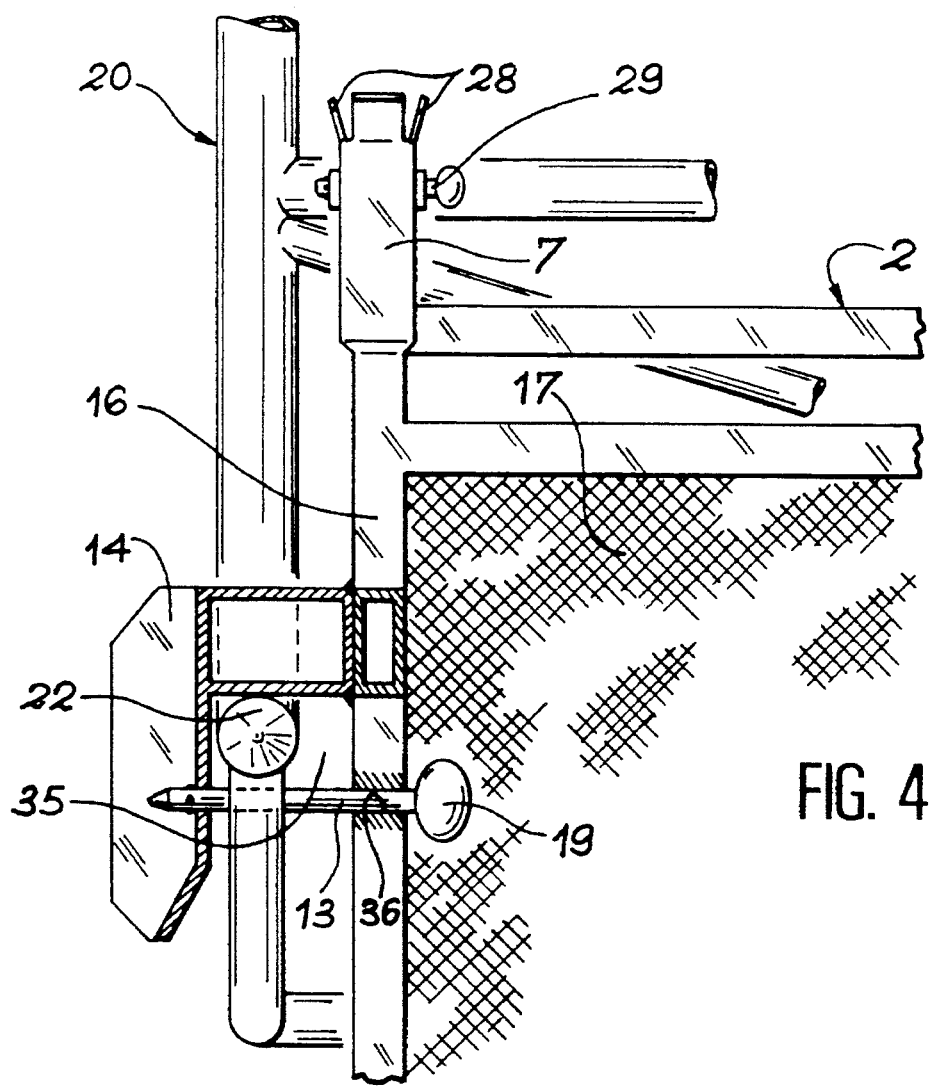

These means are shown in detail in FIG. 4. In the latter it is possible to see in profile view an end side wall 16, a hook 14 constituting the fixing means, a longitudinal side wall 17, a gripping end 22 for the fork 20 and part of the latter. It can be seen that the hook 14 is fixed to the end side wall 16, so as to constitute a recess 35 for the gripping end 22 of the fork 20, access to said recess 35 taking place from below the hook 14. The gripping end 22 is introduced horizontally, said horizontal position being naturally obtained when the fork 20 is suspended on the helicopter by means of rope slings 25. Thus, the shape of the fork 20 is defined as a function thereof.

In order to avoid inopportune movements of the gripping end 22 relative to the hooks 14, i.e. the fork 20 relative to the nacelle 2, it is preferable to provide means for locking the nacelle 2 to the fork 20. As shown in FIG. 4, these locking means are advantageously constituted by a pin 13 locking in horizontal translation the gripping end 22 relative to the hooks 14. Thus, within the hook 14, in the gripping end 22 and in the end side walls 16, holes 36 are provided for this purpose.

As shown in FIG. 2, the holes in the gripping end 22 can merely be constituted by an empty space in the metal structure 21 of the fork 20. This location is symbolized by a broken line circle 63. In the sane way a hole in the hook 14 is designated 36 to symbolize the position of said looking pin 13. It is indispensable for said pin 13 to traverse the gripping end 22 and at least one of the elements from among the hook 14 and the end side wall 16. Any other random means for locking the gripping end 22 on the nacelle 2 can be provided.

The pin 13 can easily be removed from the interior of the nacelle 2 by the operators using a gripping handle 19. Thus, once the nacelle 2 is positioned and fixed on the overhead cables 1, the operators can remove the pin 13 and thus unlock the fixing of the fork 20 relative to the nacelle 2. The fork 20 can then be removed by the helicopter by a horizontal translation completed by a downward translation.

The reverse operation can take place when all the operations having to be performed on the overhead cables 1 are finished. The fork 20 is then moved by the helicopter towards the nacelle 2, so that the gripping end 22 passes below the hooks 14. The operators can then lock the fork 20 relative to the nacelle 2 with the aid of the pin 13.

Figure 5A:
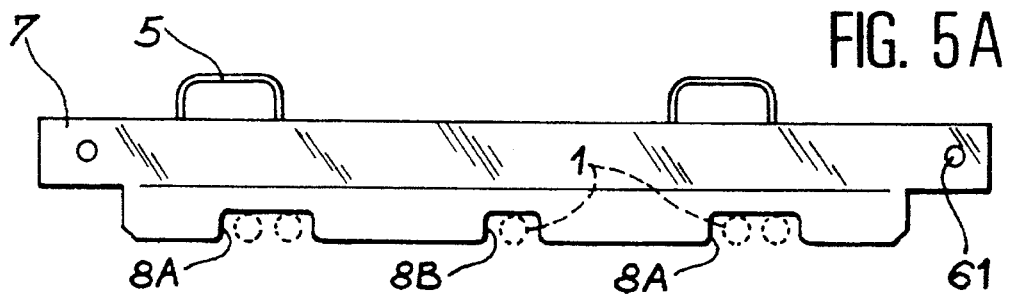

On returning to FIG. 2, an embodiment of the means for fixing the nacelle 2 relative to the cables 1 consists of providing a fixing bar 7 above each end side wall 16. With the aid of the corresponding end side wall 16, the fixing bar 7 secures the cables 1 in the nacelle 2. Preferably, for positioning overhead cables 1 relative to the nacelle 2, each fixing bar 7 has lower notches 8. The shape and size of the notches corresponds to the respective shape and position of the cables 1. More precisely, as shown in FIG. 5A, a first embodiment of the fixing bar consists of providing two side notches 8A, whose width corresponds to at least twice that of the cable 1, so that two cables 1 can be located in each of the notches 8A. If the bundle of overhead cables has a central cable, a central notch 8B can be provided with a width slightly exceeding that of the corresponding cable 1.

Figure 5B:
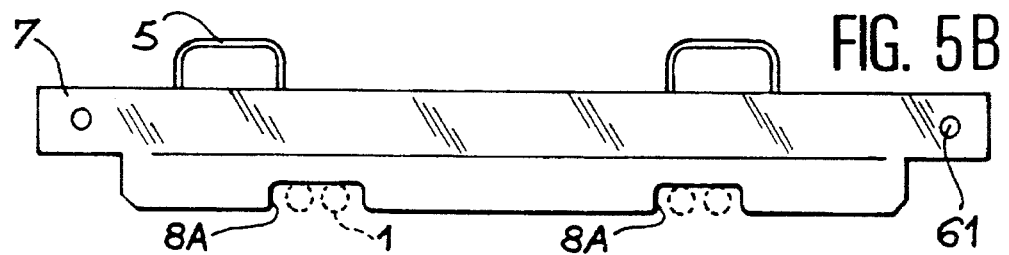

The second embodiment illustrated by FIG. 5B shows a second embodiment of the fixing bars 7 with only two side notches 8A able to receive two overhead cables 1.

It is thus possible to provide numerous pairs of fixing bars 7, each having notches, whose shapes and positions correspond to the size and position of the cables of the different bundles of overhead cables. Nevertheless each fixing bar 7 has in this case standard fixing means able to adapt to a single nacelle 2 and in this case a hole 61. Thus, no matter what the shape and position of the notches 8, 8A and 8B, the position of the fixing hole 61 of the fixing bars 7 must be the sane. In the represented embodiment, each fixing bar 7 can be locked to the upper end of end side walls 16. For this purpose it is possible to provide a system of lockable pins 29 shown in profile view in FIG. 4. It is possible to see a locking pin 29 entering the guide bar 7 and two flanges 28, each integral with the end side wall 16. Each fixing bar 7 can also be provided with manipulating handles.

This manner of fixing the cables is only an embodiment and other means are possible for adapting a single nacelle 2 to several types of bundles of overhead cables 1.

Thus, a working nacelle 2 can be used for several operators and their equipment. Therefore different accessories can be used on board the nacelle for housing the equipment or for supplying power, e.g. an explosion motor.

Fork

The right-hand part of FIG. 2 shows the carrying element for the nacelle 2, namely a fork 20. This fork-shaped element 20 facilitates the gripping of the nacelle 2 and the deposition of the latter. The relative movements of the fork 20 with respect to the nacelle 2 are symbolized by the horizontal arrows shown alongside the gripping ends 22. The latter are kept horizontal by the configuration of the metal structure 21 of the fork 20, whose weight distribution provides a balance, the gripping end 22 being horizontal.

The metal structure 21 of the fork 20 preferably comprises detour bars 62 for ensuring that the overhead cables do not penetrate the operational space of the nacelle 2 on the side of the fork 20. In particular, it also has an upper bar 32 to which are fixed securing means, in the form of rings 12, for fixing to the helicopter rope slings 25.

Figure 3:
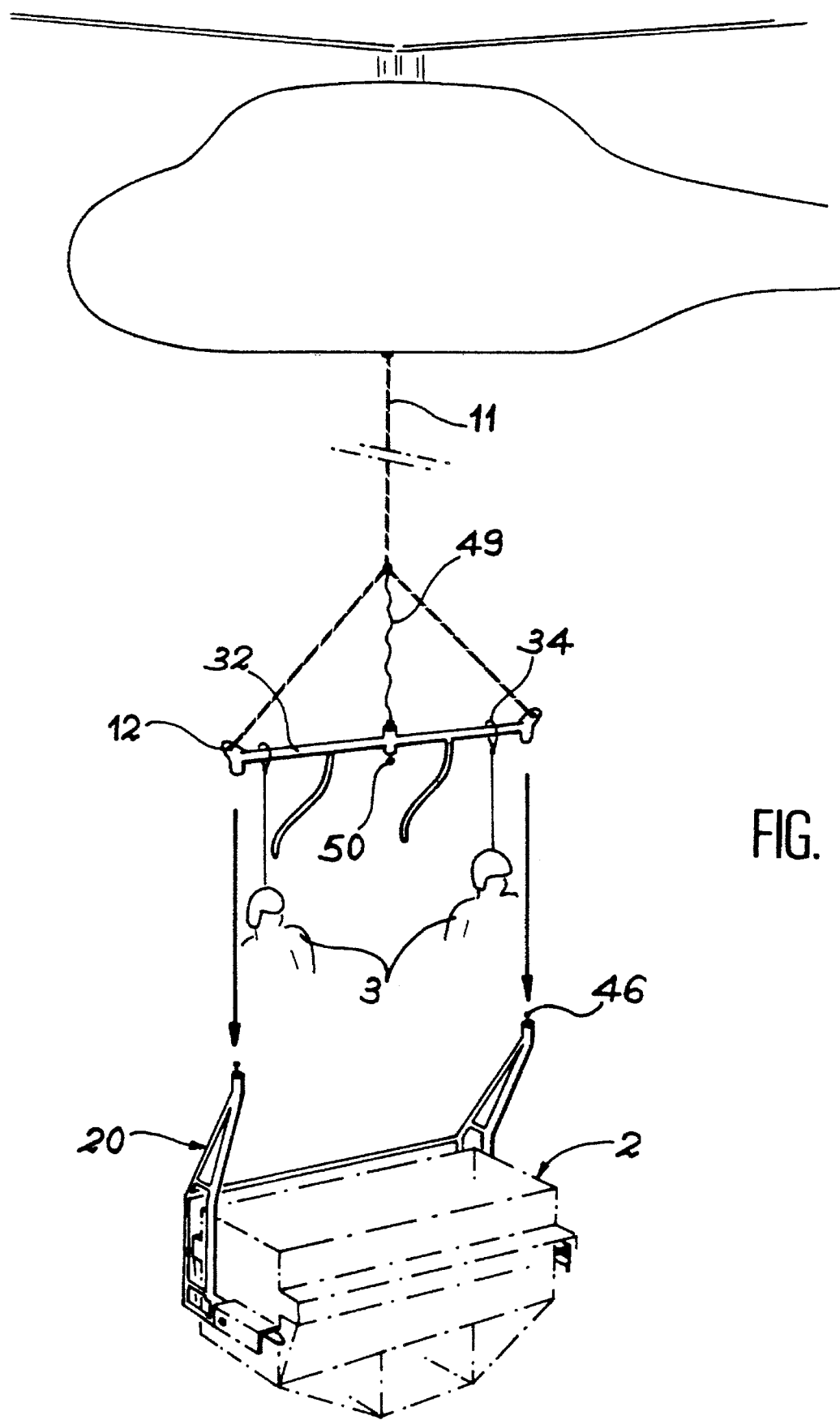

The fixing of said upper bar 32 to the metal structure 21 of the fork 20 preferably takes place by means of pyrotechnic bolts 46 placed within the metal structure 21. Thus, as shown in FIG. 3, these pyrotechnic bolts 46 constitute an example of means making it possible to jettison the metal structure 21 of the fork 20 and therefore the nacelle 2 which it supports. Each pyrotechnic bolt 46 is connected by a pyrotechnic cord 49 to control means, which can be located either on the helicopter, or on the upper bar 32. In the latter case, they can be controlled by operators 3 using a switch 50. It is thus obligatory to provide the possibility of jettisoning most of the load supported by the helicopter, in the case where the latter could be subject to a failure or a loss of power of the engine. The relatively great weight of the nacelle 2 can therefore be jettisoned in a few seconds.

To ensure that in such a situation the operators 3 do not share the same fate as the nacelle 2, means for securing the operators 2 are provided on the upper bar 32. They are preferably constituted by rings 34 to which the operators 3 can be connected by lightweight cables completed by a snap hook, as is the case in numerous activities, where a human body has to be secured relative to a fixed location.

Thus, the invention enables a team of operators to intervene on a specific cable from within a bundle of cables 1. The concept of positioning a nacelle 2 with the aid of a fork 20 makes it possible to position such a nacelle on overhead cables 1 placed in the lower part of a bundle, as a result of the lateral and bottom to top approach of the nacelle 2 relative to the cables 1 to which it has to be fixed. To ensure the stability of the nacelle, it is secured to at least two cables. However, it would also be possible to fix it to just one cable.

We claim:

1. A helicopter-carried fork (20) comprising securing means (12) adapted to be secured to slings (25) of a rope (11), and at least two gripping ends (22) extending horizontally when the fork (20) is suspended from said rope, so as to be able to penetrate corresponding fixing means of an object (2) to be seized and carried, characterized in that said fork comprises a metal structure (21) connected to an upper bar (32) by several pyrotechnic bolts (46) each connected by a pyrotechnic cord (49) to control means (50), so as to jettison the metal structure (21) and any on-board equipment in the case of an emergency; means (34) for securing operators (3) to the upper bar (32); and a hole (63) made in one of the gripping ends 22 for receiving a locking pin (13) on the object (2) to be seized.

2. A helicopter-carried fork (20) and a nacelle (2) to be seized and carried by said fork, said fork comprising securing means (12) for connecting said fork to slings (25) of a rope (11), at least two gripping ends (22) extending horizontally when the fork (20) is suspended from said rope, so as to be able to penetrate corresponding fork engaging fixing means of the nacelle (2) to be seized and carried, said nacelle (2) further comprising a metal structure (10) having two lateral end walls (16) and sized and configured for carrying operators (3) and equipment, said structure including fixing means for enabling said nacelle (2) to be fixed to at least one overhead cable (1), said fork engaging fixing means being disposed outside the end walls (16).

3. A helicopter-carried fork and nacelle according to claim 2, wherein the fixing means penetrated by the fork (20) are constituted on each side of the nacelle by a downwardly oriented hook (14) and below which can penetrate a corresponding one of said gripping ends (22) of the fork (20).

4. A helicopter-carried fork and nacelle according to claim 3, wherein the nacelle comprises means for locking the gripping ends (22) in the hooks (14).

5. A helicopter-carried fork and nacelle according to claim 4, wherein the locking means comprise a pin (13) traversing the gripping end (22) and at least one of the hooks (14) and corresponding lateral end wall (16).

6. A helicopter carried fork and nacelle according to any of claims 2–5, wherein the fixing means to the overhead cable (1) Comprise at each end of the nacelle (2) a fixing bar (7) having notches (8) and whose shape and position correspond to the shape and position of the overhead cables (1) to which the nacelle (2) is to be fixed, and means for locking each fixing bar (7) to the end walls (16) of the nacelle, the notches being oriented downwards.

7. A helicopter carried fork and nacelle according to claim 2, wherein the fixing means to the overhead cable (1) comprise at each end of the nacelle (2) a fixing bar (7) having notches (8) and whose shape and position correspond to the shape and position of the overhead cables (1) to which the nacelle (2) is to be fixed, and means for locking each fixing bar (7) to end walls (16) of the nacelle, the notches being oriented downwards.

8. A helicopter-carried fork (20) comprising securing means (12) for connecting said fork to slings (25) of a rope (11), and at least two gripping ends (22) extending horizontally when the fork (20) is suspended from said rope, so as to be able to penetrate corresponding fixing means of an object (2) to be seized and carried, characterized in that said fork is constituted by a metal structure (21) connected to an upper bar (32) by several pyrotechnic bolts (46) each connected by a pyrotechnic cord (49) to control means (50), so as to jettison the metal structure (21) and any on-board equipment in the case of an emergency and comprising means (34) for securing operators (3) to the upper bar (32).

* * * * *